United States Patent Office 3,134,170
Patented May 26, 1964

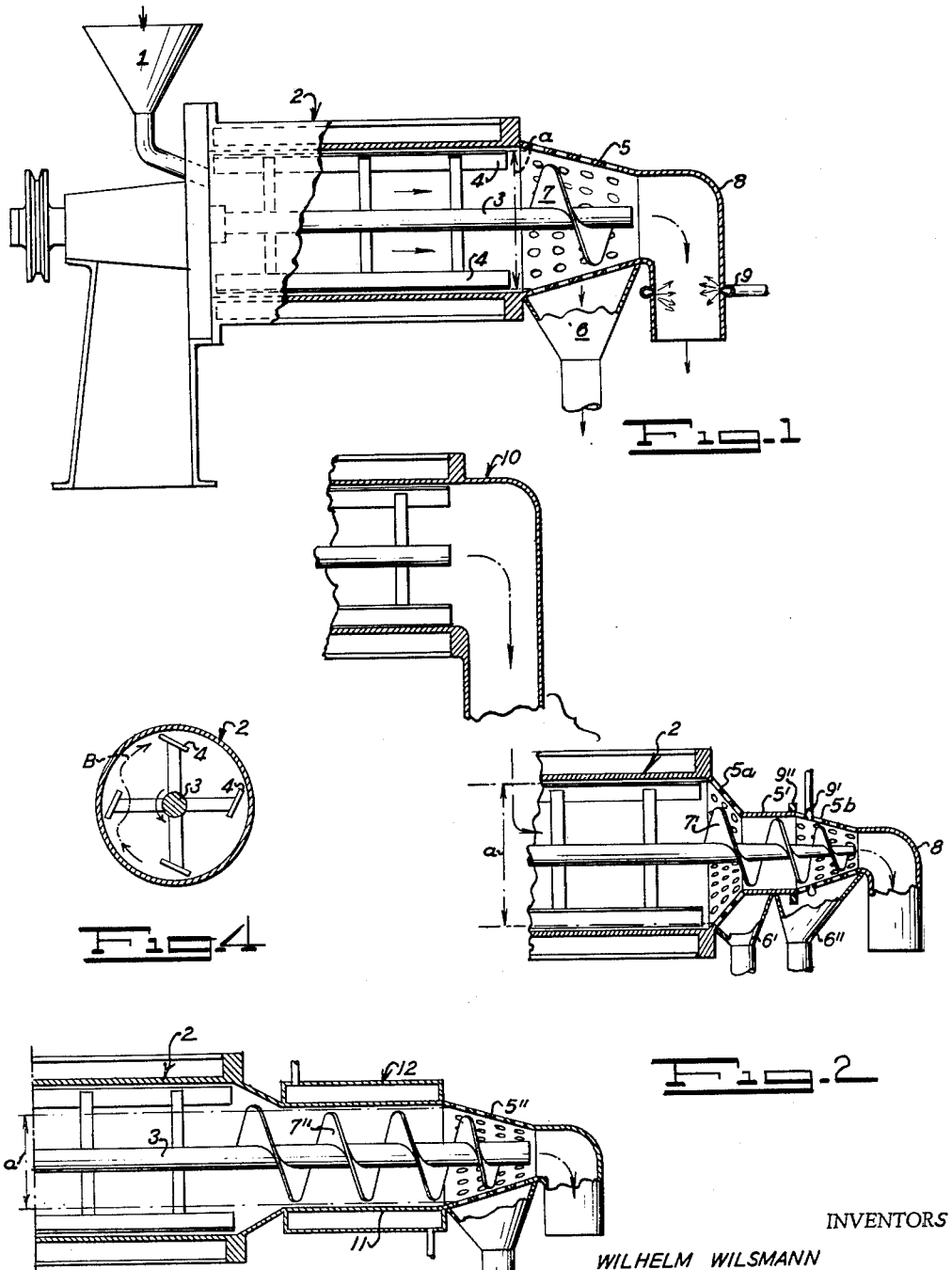

3,134,170
COMBINED CHURN AND BUTTER WORKER
Wilhelm Wilsmann and Heinrich Niemeyer, Oelde, Westphalia, Germany, assignors to Westfalia Separator AG, Oelde, Westphalia, Germany, a German corporation
Filed Oct. 31, 1960, Ser. No. 65,971
Claims priority, application Germany Nov. 23, 1959
3 Claims. (Cl. 31—33)

This invention relates to the continuous production of butter and more particularly to an apparatus for the churning of butter wherein the butter which accumulates may be recovered in concentrated form substantially free from attendant buttermilk.

In the continuous production of butter according to the Fritz technique, which is conventionally used, cream passes into the churning cylinder wherein the same is transformed by means of rapidly rotating beating strips or slats into butter granules and buttermilk. This mixture is fed into a butter compacting device, generally by gravity feed, wherein the butter granules, upon the separation of the attendant buttermilk, are subjected to treatment with two oppositely rotating worm elements which intimately mix the butter granules and force the desired butter from the device in an inter-mixed cohesive strand or belt of butter, whereupon the same may be conveniently cut into pieces of the desired weight and packaged for sale. The churning cylinder is provided at its outlet end with a hood-shaped outlet member conveniently connected directly to the butter compacting device. The hood-shaped outlet member generally has the same diameter as that of the churning cylinder so that the mixture of loose butter granules and attendant buttermilk passes without hindrance or compacting into and through the outlet member. The separation of the buttermilk from the butter granules takes place in the first third portion of the accompanying butter compacting device.

In accordance with a modified technique, the cream is pre-churned in a preliminary churning cylinder equipped with a system of rotating beaters before the mass of butter-containing material is introduced into the main churning cylinder. This preliminary churning operation, sometimes called preliminary frothing off or foaming, may be carried out with the use of air or gas by blowing the same into the cream, as well as by means of the mechanical beating or stirring mechanisms mentioned above. The further processing of the preliminary frothed cream is carried out in the main churning cylinder in the conventional manner and the obtained mixture of butter granules and buttermilk is then passed by gravity feed to the butter compacting device positioned immediately therebelow and adjacent the hood-shaped outlet member of the main churning cylinder.

In the making of butter by the churning process, it is known that the buttermilk, separated from the butter granules in the butter compacting device by a squeezing off operation, still contains a considerable amount of butter fat. This butter fat may be recovered from sweet cream buttermilk by means of after-separation techniques in a convenient manner. However, with respect to sour-cream buttermilk, this fat recovery is considerably more difficult since a centrifugal drum separation is generally applied for this purpose and the flow passages of the centrifugal drum disadvantageously become quickly clogged and stopped up with the buttermilk constituents being treated due to the high albumin content of the buttermilk. Heretofore, therefore, this high fat content of sour cream buttermilk, which accumulates as a result of the conventional Fritz method, could not be economically utilized. Thus, an economical production of sour-cream butter, according to this conventional process could never be attained.

It is an object of the present invention to overcome the foregoing drawbacks and to provide an apparatus and technique for the continuous production of butter according to the churning process wherein the fat content in the buttermilk portion of the cream may be conveniently reduced.

Other and further objects of the invention will become apparent from a study of the within specification and accompanying drawings, in which:

FIG. 1 is a schematic view of a churning cylinder arrangement for the continuous production of butter in accordance with one embodiment of the invention, FIG. 2 is a schematic view of an arrangement in accordance with an alternate embodiment of the invention wherein a preliminary frothing or foaming cylinder is used in connection with the main churning cylinder, FIG. 3 is a further embodiment of an apparatus for churning butter in accordance with the invention, and FIG. 4 is a schematic view showing the positioning of the churning or beating strips or slats on the beating means in accordance with the invention.

It has been found, in accordance with the invention, that the fat content of the buttermilk portion, and particularly that in sour-cream buttermilk, may be considerably decreased by providing between the churning cylinder and the end outlet portion thereof which leads to the butter-compacting device, a flow conduit having an increasingly constricted flow cross-sectional portion in the direction of the end outlet member of the churning cylinder, said flow conduit having a perforated flow portion therealong.

Thus, a churning cylinder is provided having an inlet and an outlet means as well as a rotatable means therewithin for rotating the mass of cream to be churned within the churning cylinder. A perforated flow conduit is provided between the churning cylinder and the outlet means therefor, the perforated flow conduit having a portion with an increasingly constricted flow cross section in the direction of the outlet means. The perforated flow conduit is conveniently provided with a conical sieve portion through which the buttermilk may be passed separately from the accumulating butter granules.

Thus, the perforated flow conduit is placed axially adjacent to and in flow communication with the churning cylinder at one end and in flow communication with the outlet means at the other end of the conduit. The rotatable means may include a worm extension passing into the perforated flow conduit. The rotatable shaft radially outwardly carries a plurality of spaced apart axially extending rotatable blade means or slats, the outermost edges of the blade means or slats being spaced from the inside wall of the churning cylinder sufficiently to permit sliding rotation of the blade means with respect to the inside wall for the efficient churning of the cream contents and for forming butter in the churning cylinder. Suitably, the worm extension correspondingly converges along the increasingly constricted flow cross section of the flow conduit being spaced from the inside wall sufficiently to permit the sliding rotation. The worm extension is preferably provided with an angle of pitch of at least 45 degrees with respect to the axis of the churning cylinder.

Receptacle means are conveniently provided adjacent the outside wall of the perforated flow conduit for receiving the buttermilk material passing out through the perforations. In the same way nozzle means may be provided adjacent the outlet means for the butter granules in order to direct washing fluid into the butter granules for washing the same.

The perforated flow conduit may preferably include a cylindrical portion and a conical portion. The cylindrical portion may be adjacent to and in flow communication with the churning cylinder, having a smaller diameter than that of the churning cylinder. The conical portion, on the other hand, may be perforated and may serve to flow communicate the cylindrical portion of the perforated flow conduit with the outlet means. In this means, the cylindrical portion of the flow conduit may be provided with a cooling jacket while the conical portion may be provided with receptacle means for taking off the buttermilk which passes out through the perforations in the conical portion.

In accordance with one embodiment of the invention, the perforated flow conduit is increasingly constricted in steps and several separate perforate portions are provided therealong.

Thus, in accordance with the invention, by means of the increasingly constricted flow conduit, a portion of the buttermilk remains in the churning cylinder which is uniformly distributed as an annular liquid ring on the inner wall of the churning cylinder due to the rotating action of the beating or churning blades. By working the buttermilk layer within the churning cylinder in the manner of the invention, the butter granules present in the buttermilk layer which are generally present in the form of fine fat particles are conveniently added to the main mass of butter granules. This result could not be achieved in accordance with previous techniques.

Due to the increasing constriction of the flow conduit, the butter granules are subjected to greater compression and compacting as they move along their path of travel from the churning cylinder to the outlet portion. This causes the buttermilk, placed under pressure by the rotational action, to pass out through the sieve openings, through the compacted butter granules. In this manner, the fine fat particles in the buttermilk are filtered therefrom and remain with the main mass of butter granules.

The blades or slats of the beating means in the churning cylinder may be radially outwardly directed against the inside wall of the churning cylinder or may be positioned diagonally so that the blades or strips will act as a scraping knife lifting off the butter granules from the churning cylinder wall.

The conveyor worm is advantageously attached to the same shaft as that which carries the rotating blades and is shaped so as to be peripherally co-extensive with the contour of the flow conduit. The conveyor worm is provided with an angle of pitch which is at least 45 degrees with respect to the axis of the rotating shaft since only a low conveyor performance or output is necessary. It is most preferred for best results to employ an angle of pitch of about 85 degrees. This ensures a most careful treatment of the butter granules in the churning operation step wherein a portion of the buttermilk is preliminarily removed then from the butter granules prior to the compacting of the butter granules in the butter compacting device.

Thus, the constricted flow conduit may be provided in step-wise effect having one or more cylindrical portions and one or more conical portions, such that an over-all decrease in flow cross section from the diameter of the churning cylinder to the diameter of the outlet means will be effected. In this connection, by means of suitable cooling jackets, the butter mixture may be subjected to the desired heat exchange during its path of travel from the churning cylinder to the outlet means.

Referring to the drawing a churning unit is shown in FIG. 1 wherein the raw cream is conducted by means of inlet funnel 1 into the churning cylinder 2 where it is subjected to the action of beating blades 4 mounted for rotation on shaft 3 within cylinder 2. Blades 4 continuously scrape the inside wall of cylinder 2 to ensure intensive mixing and scraping of the accumulating butter granules and buttermilk from the container wall. Upon the transformation of the raw cream into butter granules and buttermilk, the mixture is conveyed along the conical sieve portion 5 wherein the buttermilk passes through the sieve openings and falls into the receptacle funnel 6 disposed adjacent conical sieve portion 5. The butter granules are essentially freed from the buttermilk in this manner and conveyed by worm 7 to the outlet member 8 adjacent thereto. The butter is then passed to a butter compacting device (not shown) wherein the remaining buttermilk will be squeezed out from the butter granules and the butter recovered in cohesive compacted form. The worm 7 may be provided in a discontinuous manner and may even be developed with a plurality of fan blades instead.

In consequence of the conical constriction of the portion 5, the buttermilk dams up in cylinder 2 while the butter granules dam up in the conically constricted portion 5. The level of the dammed-up butter granules is indicated at $a$. By the action of the beating blades 4, the efficient churning is carried out in cylinder 2 such that the mixture of buttermilk and butter granules will pass to the conically constricted portion 5 with the agglomeration of the fat particles suspended in the buttermilk being readily passed to the mass of butter granules therein. The butter granules in the conically constricted portion 5 serve to filter the fat particles from the buttermilk and retain the same while the buttermilk passes out of the perforated openings in portion 5. The buttermilk received within the receptacle 6 is in this manner practically free from any butter granules or fat particles whatsoever.

In order to effect suitable washing of the butter granules leaving the outlet member 8, nozzles 9 are provided thereat in the conventional manner. In the same way, other devices may be used for washing the butter granules such as a sprinkler. These washing devices may be provided at any point before the butter compacting device wherein the butter is finally mixed into a cohesive mass and extruded in the form of a continuous strip. Of course, the separation of the wash water from the butter granules takes place prior to the butter compacting step in accordance with the well known techniques.

As may be seen from FIG. 2, a preliminary frothing or foaming cylinder 10 is provided in flow connection with churning cylinder 2 wherein the preliminary treatment of the raw cream may take place prior to the churning action in cylinder 2. In this embodiment, the conically constricted portion is provided with an offset step-wise decrease in cross section from cylinder 2 to the outlet member 8. Thus, a conical portion 5a, having perforations therein, flow connects cylinder 2 with a cylindrical portion 5′ of reduced cross section. Cylinder 5′, in turn, is connected with the outlet member 8, via the conical portion 5b, which is also provided with perforations. The worm 7′ in this case follows the contour of the flow passage defined by parts 5a, 5′, and 5b. The level of the dammed-up butter granules is indicated at $a$ as similarly shown in FIG. 1.

In this connection, it will be appreciated that while the buttermilk is separated via the perforations in conical portion 5a in the same manner as effected in accordance with the embodiment of FIG. 1, the washing of the butter granules may be effected conveniently at the sieve openings in conical portion 5b by providing suitable nozzles for directing washing fluids thereat. As shown in FIG. 2, nozzles 9′ are situated at the first sieve openings in conical portion 5b for increased washing effectiveness. A dripping ring 9″ is positioned about the circumference of cylinder 5′ adjacent the first sieve openings in conical portion 5b to retain the wash water within the desired flow path. In consequence of the use of two conical sieve portions, the buttermilk is advantageously collected in receptacle 6′ while the wash water is separately collected in receptacle 6″.

With respect to FIG. 3, the flow conduit between the churning cylinder 2 and the conical sieve 5″ is provided as a cylinder 11, having a reduced diameter with respect to cylinder 2. Because of the lower peripheral velocity in the cylinder portion 11, the rotating butter granules are acted upon in a most careful and delicate manner, such that by worm 7″ the complete churning out of the milk fat is obtained as well as the agglomeration of the finer fat particles onto the main mass of the butter granules whose level is indicated at *a* in the same way as shown in FIG. 1.

A suitable cooling jacket 12 is provided along the cylindrical portion 11 for effecting the cooling of the butter granules passing therethrough, but it will be appreciated that jacket 12 may be provided as any heat exchange means for adding or removing heat as desired.

FIG. 4 illustrates one embodiment of the particular positioning of the beating blades 4. In this embodiment four such blades are shown, each blade being positioned at an angle with respect to the radius of shaft 3, such that the blades 4 may conveniently lift-off and scrape the butter granules from the cylinder wall 2 and again convey them back to the surface of the buttermilk layer.

It will be appreciated that, depending upon the desired degree of preliminary frothing and foaming, it may be appropriate under certain circumstances to provide on the preliminary foaming or frothing cylinder a similar conically constricted flow passage in the manner of the invention.

By employing the apparatus in accordance with the invention, the fat content of the buttermilk removed from the butter granules is so far decreased that the instant invention enables the production of sour-cream butter to be carried out in accordance with the Fritz churning process in a continuous manner, even though heretofore this could not be economically achieved. This is true since the buttering cylinder and outlet conduit therefor in the conventional Fritz butter machines have practically the same diameter such that the mixture of butter granules and buttermilk cannot be readily separated, whereas by means of the perforated conical portion at the outlet end of the churning cylinder in accordance with the invention the butter granules are dammed-up concentrically within an annular ring of buttermilk. Consequently, the rotating blades, revolving at a relatively high number of revolutions will carry the loose butter granules again and again through the buttermilk ring whereupon the fat particles suspended in the buttermilk will be deposited and accumulated on the coarser butter granules. The level line *a* (see FIGS. 1–3) illustrates the separation of the outer buttermilk ring from the inner butter granules, and it will be appreciated that as the mass moves to the conical sieve portion, the buttermilk will pass through the sieve openings at the level *a* substantially free from fat particles while the butter granules will become compacted and pass through the outlet conduit.

The following example is set forth for the purpose of illustrating the invention and it is to be understood that the invention is not to be limited thereby.

*Example*

The consistency of butter-fat in milk is not necessarily constant but rather depends, interalia upon the season as well as upon the type of feeding of the animals. Naturally, the dimensions of the buttering devices are dependent upon the capacity contemplated, and therefore are greater in buttering machines used for a higher hourly capacity than machines having a lower hourly capacity. In a buttering machine in accordance with the invention having a buttering capacity of 400 kg. per hour and a buttering cylinder length and conical perforated flow conduit length of about 600 mm. each, 1,000 kg. of cream having a fat content of 36% and a degree of acidity of 20 degrees S.H. (Soxhlet-Henkel), which corresponds to a pH value of 4.6, are buttered at a temperature of 11 degrees C. In this manner, 436 kg. of sour cream butter accumulated as opposed to 564 kg. of buttermilk wherein the buttermilk had a residual fat content of 0.5%.

Under otherwise equal conditions, using the same amount of cream, the fat content in the buttermilk amounted to 1.2% where a conventional Fritz buttering machine was employed having no conical perforated flow conduit but instead a buttering cylinder and outlet conduit therefor with practically the same diameter.

The above mentioned results were obtained with an embodiment according to FIG. 1.

What is claimed is:

1. Apparatus for the continuous production of butter by the churning method which comprises a churning cylinder having inlet and outlet means and having rotatable means for rotating the mass to be churned within the churning cylinder, a peripherally outwardly perforated flow conduit being provided between said cylinder and said outlet means having a cylindrical portion and a conical portion, said cylindrical portion being adjacent to and in flow communication with said churning cylinder, and having a smaller diameter than said churning cylinder, said conical portion being perforated and flow communicating said cylindrical portion with said outlet means, said rotatable means including a worm extension passing into said perforated flow conduit, said worm extension being peripherally coextensive with the contour of said cylindrical portion and said conical portion and spaced from the inside wall of said perforated flow conduit sufficiently to permit rotation of said worm extension.

2. Apparatus according to claim 1 wherein said cylindrical portion is provided with a cooling jacket and said conical portion is provided with receptacle means adjacent its exterior for receiving material passing out of said conical portion by means of perforations defined therein.

3. Apparatus for the continuous production of butter by the churning method which comprises a churning cylinder, an inlet provided at one end of said cylinder and a peripherally outwardly perforated flow conduit at the other, said flow conduit axially flow communicating said churning cylinder with an outlet means, said flow conduit including a cylindrical portion of reduced diameter with respect to said churning cylinder, said flow conduit also including a first conically constricted sieve portion converging in the direction of said outlet means provided between said churning cylinder and said flow conduit cylindrical portion, said first conical sieve portion having a diameter becoming increasingly reduced from the diameter of said churning cylinder to that of said flow conduit cylindrical portion, said flow conduit further including a second conically constricted sieve portion converging in the direction of said outlet means provided between said flow conduit cylindrical portion and said outlet means, said second conical sieve portion having a diameter becoming increasingly reduced from the diameter of said flow conduit cylindrical portion to that of said outlet means, and a rotatable shaft radially outwardly carrying a plurality of axially extending blade means within said churning cylinder for sliding contact with the inside wall of said churning cylinder, said shaft including a conveyor worm extension passing into said flow conduit and being peripherally coextensive with the contour of said flow conduit for sliding contact with the adjacent inside wall of said flow conduit.

References Cited in the file of this patent

UNITED STATES PATENTS

| | | |
|---|---|---|
| 19,421 | Helton | Feb. 23, 1858 |
| 2,108,696 | Troutner | Feb. 15, 1938 |
| 2,193,462 | Miollis | Mar. 12, 1940 |
| 2,463,915 | Shadwick | Mar. 8, 1949 |
| 2,510,420 | Ross | June 6, 1950 |
| 2,521,398 | North | Sept. 5, 1950 |
| 2,649,377 | Wilsmann | Aug. 18, 1953 |
| 2,991,503 | Rietz | July 11, 1961 |